May 20, 1952 G. S. PERKINS ET AL 2,597,371
DOUBLE-ENDED JOURNAL AIR BEARING
Filed March 27, 1950

INVENTORS
GERALD S. PERKINS
PAUL R. VOGT
ROBERT R. WEBER

BY *William R. Lane*
ATTORNEY

Patented May 20, 1952

2,597,371

UNITED STATES PATENT OFFICE 2,597,371

DOUBLE-ENDED JOURNAL AIR BEARING

Gerald S. Perkins, Altadena, and Paul R. Vogt and Robert R. Weber, Los Angeles, Calif., assignors to North American Aviation, Inc.

Application March 27, 1950, Serial No. 152,034

6 Claims. (Cl. 308—9)

This invention pertains to supporting a mass for a single degree of angular freedom, and particularly to a pneumatic bearing adapted to support a mass for a single degree of angular freedom and without appreciable friction.

It is an object of this invention to provide a pneumatic bearing adapted to support a mass for angular freedom about a single axis.

It is another object of this invention to provide a single axis pneumatic bearing support which is simple to adjust.

It is another object of this invention to provide a single axis pneumatic bearing support which applies substantially no extraneous torque to the supported object.

It is another object of this invention to provide a single axis pneumatic bearing support which is relatively simple to fabricate.

It is another object of this invention to provide a single axis pneumatic bearing support which requires a minimum of close tolerance machine work.

It is another object of this invention to provide a single axis pneumatic bearing support which eliminates the problem of careful alignment present in pneumatic bearing supports heretofore known.

It is another object of this invention to provide a pneumatic bearing support which is extremely rigid and unaffected by linear accelerations.

Other objects of invention will become apparent from the following description taken in connection with the accompanying drawings, in which Fig. 1 is a plan view of the invention partly in section;

Figure 1:
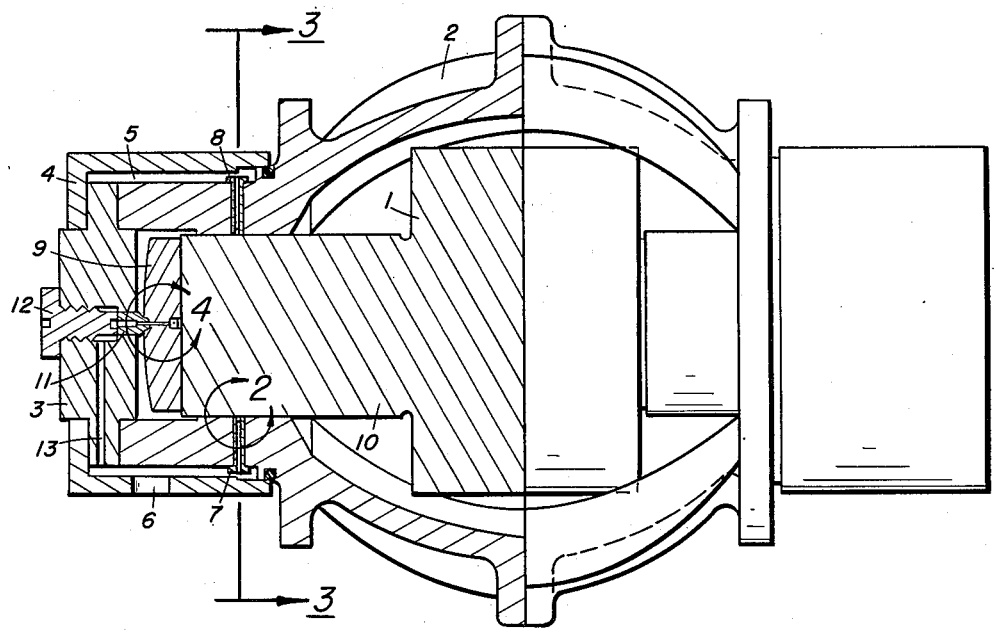
Figure 3:
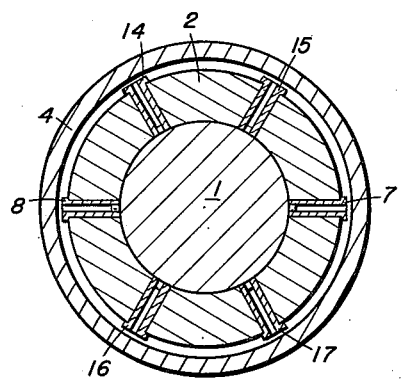
Fig. 3 is a sectional view taken at 3—3 in Fig. 1.

Referring to Fig. 1, a gyroscope or other mass 1 is supported radially on cylindrical journal casing 2. End member 3 is rigidly attached to casing member 2 and manifold 4 fits over end member 3 as shown, allowing annular air space 5 and pressure port 6 for the conduction of air or other gases. Feed orifices 7, 8, 14, 15, 16 and 17 are provided in casing 2, as shown in Fig. 3, and circular pad 9 fits against the end of journal 10 attached to mass 1. Pad 9 receives air through hollow pivot 11 in end member 3 which is held in place by adjustable screw 12 threaded into end member 3. Air conduit 13 conducts air from space 5 to pivot 11.

In operation the device functions as follows: Air or other gas is introduced under pressure of the order of 75 pounds p. s. i. through port 6 and is distributed to the pad via conduit 13 through end member 3 and to the surfaces of journal 10 via orifices 7, 8, 14, 15, 16 and 17 in case member 2. Application of this air pressure to the surfaces of journal 10 causes mass 1 to be floated on a thin film of air. Casing member 2 is of steel or other rigid metallic material and may be machined to a very smooth surface. The two halves of casing 2 must be machined to the same concentricity, but this may be done on a single machine. The inner cylindrical walls of the two halves of casing member 2 must be coplanar to assure a uniform film of air throughout the periphery of journal member 10. Journal member 10 must be carefully machined to be but a few thousandths of an inch less in diameter than the inside diameter of the cylindrical portion of casing 2. The length of journal member 10 is not critical because pad 9 may be brought into position by adjustment of screw member 12.

Figure 2:
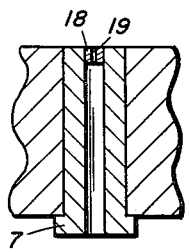
Fig. 2 is an enlarged sectional view of one of the air feed orifices of this invention taken in the area indicated generally by line 2 in Fig. 1.

Fig. 2 shows in enlarged detail one of the feed orifices typical of all those employed in this invention. A cylindrical jewel 18 is press fit in the end of feed orifice 7, leaving a small restriction 19 through which all the air which reaches the bearing surface of mass 1 must pass. These small restrictions serve to prevent variations in pressure in the bearing area from affecting the air pressure in annular air space 5. If, therefore, mass 1 is assumed to deviate slightly from a concentric position wth respect to frame 2, the radial bearing surface on the side toward which the deviation occurs will experience an increase of pressure, and the radial bearing surface on the side away from which the deviation occurs will experience a decrease in pressure. The result is a net restoring force tending to maintain concentricity of mass 1 and bearing 2.

Figure 4:
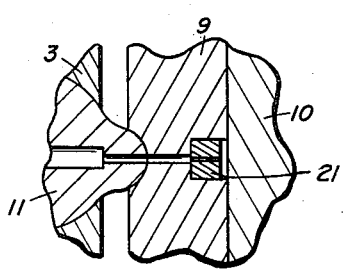
Fig. 4 is an enlarged sectional view of a pad pivot of the invention taken in the area indicated generally by line 4 in Fig. 1.

In Fig. 4 pivot 11 fits in pad 9 having conduit 20 for conducting air to the ends of journal 10. A cylindrical jewel 21 with restricting orifice drilled through it serves the same purpose as jewel 18 shown in Fig. 2. It is to be understood that an identical pad (not shown) fits against the opposite end of mass 1 and that the entire device is symmetrical about a vertical line bisecting journal casing 2 in Fig. 1.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A pneumatic bearing for supporting a mass for a single degree of angular freedom comprising a rigid elongated unitary housing having a cylindrical journal bearing in either end thereof, a cylindrical journal shaft attached rigidly to either end of said mass and adapted to fit intimately within said journal bearings, two circular pads pivotable with respect to said housing and adapted to fit against the ends of said shaft, means for supplying air under pressure to the space between said pads and the ends of said shaft, and means for supplying air under pressure to the space between said journal bearings and said shaft to thereby support said mass in said journal bearings and on said pads for a single degree of angular freedom.

2. A device as recited in claim 1 in which said means for supplying air under pressure include a plurality of orifices intersecting the inner surfaces of said journal bearings in a radial direction, an orifice in each of said pads oriented along the axis of said cylindrical shaft, and jewelled restrictions in said orifices whereby the air pressure applied to the surfaces of said shaft tends to vary inversely with the distance between said shaft and said journal bearings and pads and thus tends to maintain said shaft concentric with said journal bearings and centered between said pads.

3. Means for supporting a mass for a single degree of angular freedom comprising a pair of journals attached rigidly on a common axis to opposite sides of said mass, a unitary frame surrounding said mass and including open-ended journal bearings adapted to fit over said journals intimately, a flat bearing pad pivotally supported by said frame against the ends of said journals, and means for introducing fluid under pressure between said journals and said journal bearings and between said journals and said bearing pads whereby said mass is supported for a single degree of angular freedom.

4. A device as recited in claim 3 in which said means for introducing fluid under pressure comprises a plurality of orifices in said journal bearing, a centrally disposed orifice in each of said pads, fixed flow restricting means in each of said orifices, and ducts in said journal bearings for furnishing fluid under pressure to said orifices whereby said journals are kept concentric with said journal bearings and centered between said pads.

5. A pneumatic bearing for supporting a mass for a single degree of angular freedom comprising a pair of journals attached rigidly on a common axis to opposite sides of said mass, a pair of open-ended journal bearings adapted to fit over said journals intimately, a rigid frame for holding said journal bearings in concentric relationship around said journals, a flat bearing pad pivotally supported by said frame against the ends of said journals, a plurality of feed orifices in said journal bearings, a centrally disposed orifice in each of said pads, fixed flow restricting means in each of said orifices and channels in said journal bearings for furnishing air under pressure to said orifices to thereby support said mass for a single degree of angular freedom.

6. A device as recited in claim 5 and further comprising a hollow cylindrical jewel press fit in each orifice adjacent but not touching said journals to thereby furnish air pressure against said journals in proportion inversely to the distance from said pads and journal bearings to said journals thus to keep said journals centered in said journal bearings and between said pads.

GERALD S. PERKINS.
PAUL R. VOGT.
ROBERT R. WEBER.

REFERENCES CITED

The following references are of record in the file of this patent:

UNITED STATES PATENTS

| Number | Name | Date |
|---|---|---|
| 974,392 | Junggren | Nov. 1, 1910 |
| 1,906,715 | Penick | May 2, 1933 |
| 2,049,343 | Warren | July 28, 1936 |
| 2,086,896 | Carter | July 13, 1937 |
| 2,449,297 | Hoffer | Sept. 14, 1948 |